UNITED STATES PATENT OFFICE.

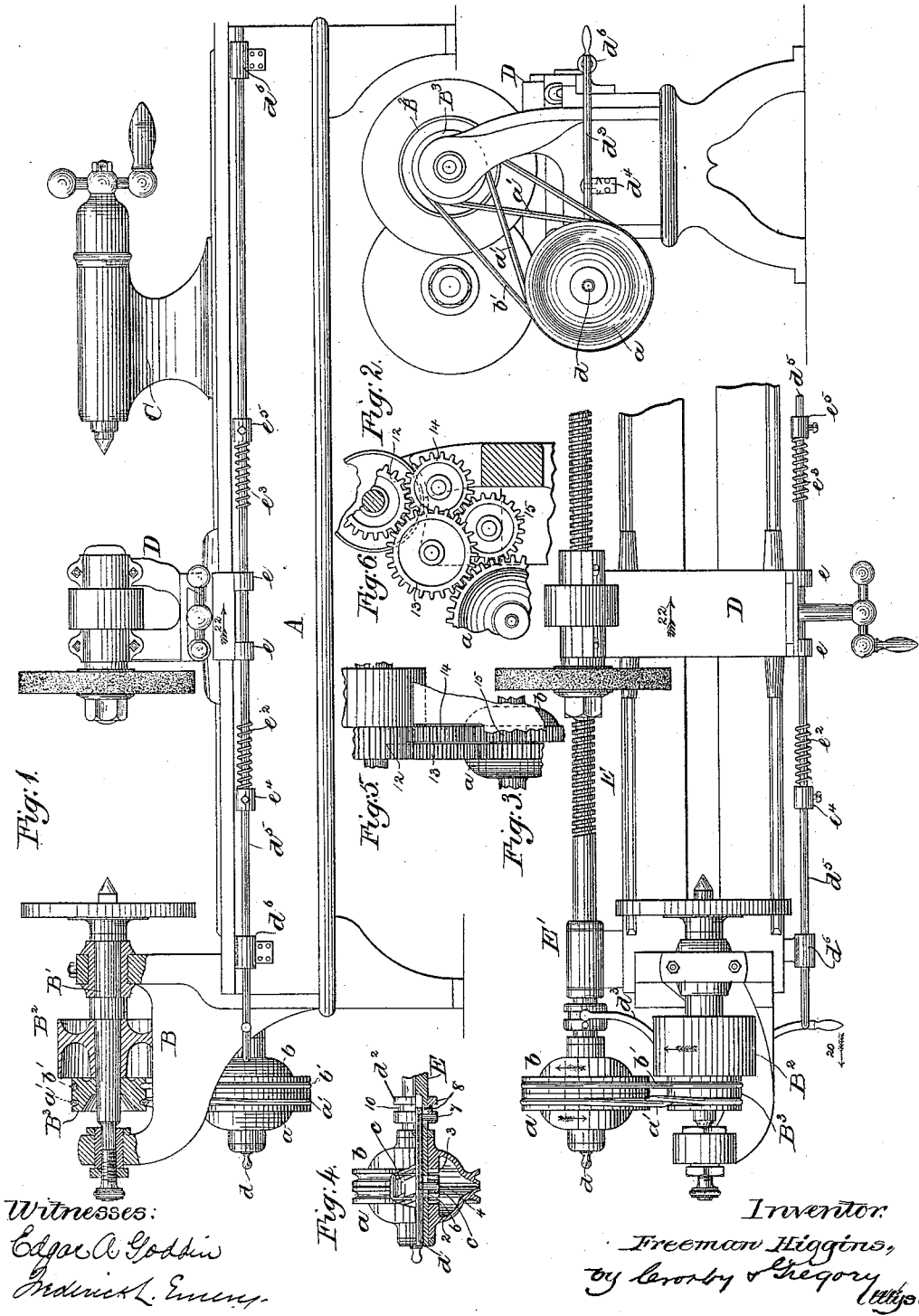

FREEMAN HIGGINS, OF MANCHESTER, NEW HAMPSHIRE.

REVERSING MECHANISM FOR LATHES.

SPECIFICATION forming part of Letters Patent No. 447,825, dated March 10, 1891.

Application filed December 24, 1889. Serial No. 334,819. (No model.)

*To all whom it may concern:*

Be it known that I, FREEMAN HIGGINS, of Manchester, county of Hillsborough, State of New Hampshire, have invented an Improvement in Reversing Mechanism for Lathes for Grinding-Surfaces, of which the following description, in connection with the accompanying drawings, is a specification, like letters and figures on the drawings representing like parts.

This invention has for its object to provide a lathe with a simple form of automatic reversing mechanism.

In accordance with my invention the reversing screw-shaft of the lathe is provided with two oppositely-rotated loose pulleys or wheels having sleeve-like hubs provided with ratchet-teeth, and between these pulleys I have splined on the said reversing-shaft a clutch-hub provided at its opposite ends with ratchet-teeth to be engaged by the ratchet-teeth of one or the other of the said pulleys, according to the position of the clutch-hub. The clutch-hub referred to is under the control of a shipper-lever and rod, the latter being actuated by a suitable part of the carriage carrying the operating-tool, herein shown as an abrading or grinding or polishing wheel. With the said rod I have combined two springs, the purpose of which I will hereinafter describe.

Figure 1, in side elevation and partial section, represents a lathe with my improvements added; Fig. 2, a left-hand end elevation of the lathe shown in Fig. 1. Fig. 3 is a partial top or plan view. Fig. 4 is a sectional detail of the shell-like pulleys and the clutch-hub and means to slide it, and Figs. 5 and 6 show a modification to be described.

The frame-work A, the head-stock B, the tail-stock C, the sliding tool-carriage D, the spindle B' in the head-stock, it having a belt-pulley $B^2$ to receive any usual driving-belt, and a driving pulley or wheel $B^3$ are and may be all as usual.

The tool-carriage has a threaded nut which engages the screw-shaft E, having suitable bearings at the side of the frame, one of said bearings being shown in Fig. 3. The screw-shaft has loose upon it two pulleys or wheels $a\,b$, each, as shown in Figs. 1 and 4, grooved or scored to be embraced by belts $a'\,b'$, the belt $a'$ being a cross-belt, so that the said pulleys or wheels $a\,b$, driven from the spindle, run in opposite directions. The pulleys or wheels $a\,b$ (best shown in Fig. 4) have respectively at their interior ratchet-teeth 2 3, which may be engaged at desired times by teeth at either end of a clutch-hub $c$, surrounding the screw-shaft E loosely and having a pin 4 extended through a slot 6 in the said shaft, the said pin 4 entering a rod $d$, fitted to slide in a hole drilled in the center of the end of the said shaft E.

The screw-shaft E is bored centrally for the reception of a sliding rod $d$. The rod $d$ has two pins 4 7. The pin 4 is extended through a slot 6 in shaft E and into the clutch $c$, while the pin 7 is extended through slot 8 in shaft E and enters a hole in an annularly-grooved collar $d^2$, loose on the shaft E. The groove 10 of the collar $d^2$ is entered by the forked end of a shipper-lever $d^3$, having its fulcrum at $d^4$, the outer end of the said lever being joined to a slide-rod $d^5$, which is adapted to slide in suitable bearings $d^6$, attached to the frame-work. The slide-rod $d^5$ is extended loosely through holes in ears $e$, depending from the tool-carriage D, the said ears, as the said carriage is moved by the screw E, meeting alternately the springs $e^2$ and $e^3$, surrounding the said slide-rod, one end of each of the said springs abutting against an adjustable collar, as $e^4$ or $e^5$, fast on the slide-rod.

When the pulley $B^2$ is driven in the direction of the arrow thereon, the belt $b'$ will rotate the pulley or wheel $b$ in the direction of the arrow thereon, and the belt $a'$ will rotate the pulley or wheel $a$ in the direction of the arrow on it.

In the drawings, Fig. 4, I have represented the clutching-hub as occupying a central position, in which position the teeth at both ends thereof are out of engagement with the teeth 2 3 of the pulleys or wheels $a\,b$, and in such condition the screw-shaft E will not be rotated. Let it be, however, supposed that the operator with his hand upon the shipper-lever $d^3$ moves the same in the direction of the arrow 20, Fig. 3, far enough to cause the teeth of the clutching-hub $c$ to engage the teeth 3 of the pulley or wheel $b$, and thereafter the screw-shaft will be rotated in a direction to move the tool-carriage D in the direction of the arrow 22 thereon. As soon, however, as the ear $e$ meets the end of the spring $e^3$ it acts upon the said spring and compresses it against the block $e^5$ until the force so exerted is sufficient to disengage the teeth of the clutching-hub $c$ from the teeth of the pulley or wheel $b$, and thereafter the spring $e^3$, which was compressed, will expand, and in so doing give an extra movement to the rod $d^5$ sufficient to cause the teeth at the opposite end of the clutching-hub $c$ to engage the teeth 2 of the pulley or wheel $a$, and immediately thereafter the pulley $a$ will rotate the screw-shaft E in the opposite direction and draw the tool-carriage D to the left, viewing Figs. 1 and 3, until a lug $e$ meets the spring $e^2$, resting at its opposite end against the collar $e^4$, and as soon as the spring is fully compressed the rod $d^5$ is moved to effect the disengagement of the teeth of the clutching-hub $c$ from the teeth of the pulley or wheel $a$ and effect the engagement of the teeth at the opposite end of the said clutch-hub with the teeth of the pulley or wheel $b$. In this way the rotation of the shaft E may be automatically reversed by the tool-carriage at each end of its stroke, and the time at which the said reversal shall take place and the length of stroke of the tool-carriage may be regulated by adjusting the collars $e^4$ $e^5$ on the rod $d^5$.

In Figs. 1 to 4 I have shown the pulleys or wheels $a\ b$ as concavo-convex or shell-like to thus inclose and cover the clutching-hub and protect the same, and the said pulleys or wheels are driven by belts; but it will be understood that my invention would be the same if the wheel or pulley $B^3$ should be provided with teeth at 12, as in Fig. 5, and the pulleys or wheels $a\ b$ be also provided at their peripheries with teeth, as in Figs. 5 and 6, the wheel 12 driving the pulley or wheel $a$ through the intermediate 13, while the pulley or wheel $b$, to be rotated in the opposite direction, will be rotated from the teeth 12 through two intermediates 14 15.

In order to enable the parts to be most compactly arranged and enable the belts to run directly between the wheel $B^3$ and the pulleys $a\ b$, I have cut away or inclined backwardly the head-stock B, as best shown in Figs. 2 and 3.

I claim—

1. The tool-carriage, the screw-shaft, and the loose pulleys or wheels thereon having clutch-teeth, means to rotate the said pulleys or wheels in opposite directions, a clutch-hub movable longitudinally on the said screw-shaft and having clutch-teeth, a rod $d$, located within the said screw-shaft and connected to said clutch-hub, combined with a collar, also connected to the said rod, a shipper-lever, and a slide-rod pivotally connected thereto and provided with springs, against which the tool-carriage contacts to move the said collar, and thereby the clutch-hub, in one or the other direction, substantially as described.

2. The tool-carriage having the lugs $e\ e$, the screw-shaft engaging and reciprocating it, two loose pulleys or wheels and a clutch-hub on the said shaft, a shipper-lever $d^3$, and means to connect it with the clutch-hub, combined with a rod extended through said lugs and springs and collars adjustable thereon, the springs being adapted to be engaged by the lugs on the said carriage to compress one or the other of the said springs and move the rod, the rod and shipper-lever being pivotally connected, substantially as described.

In testimony whereof I have signed my name to this specification in the presence of two subscribing witnesses.

FREEMAN HIGGINS.

Witnesses:
W. C. PATTEN,
MYRTA M. JONES.